United States Patent
Toyama

(10) Patent No.: US 10,313,374 B2
(45) Date of Patent: Jun. 4, 2019

(54) ELECTRONIC APPARATUS AND METHOD

(71) Applicant: Kabushiki Kaisha Toshiba, Minato-ku (JP)

(72) Inventor: Haruhiko Toyama, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 178 days.

(21) Appl. No.: 14/978,058

(22) Filed: Dec. 22, 2015

(65) Prior Publication Data

US 2016/0112449 A1 Apr. 21, 2016

Related U.S. Application Data

(63) Continuation of application No. PCT/JP2013/067880, filed on Jun. 28, 2013.

(51) Int. Cl.
| | | |
|---|---|---|
| *H04L 29/06* | (2006.01) | |
| *H04L 12/24* | (2006.01) | |
| *H04L 29/08* | (2006.01) | |

(52) U.S. Cl.
CPC ........ *H04L 63/1425* (2013.01); *H04L 41/069* (2013.01); *H04L 63/1416* (2013.01); *H04L 67/2842* (2013.01)

(58) Field of Classification Search
CPC .......................... H04L 63/1425; H04L 41/069
USPC .......................................................... 726/23
See application file for complete search history.

(56) References Cited

U.S. PATENT DOCUMENTS

| | | | | |
|---|---|---|---|---|
| 5,428,616 A | * | 6/1995 | Field | H04L 49/206 370/253 |
| 5,666,484 A | * | 9/1997 | Orimo | G06F 9/5083 714/18 |
| 7,349,339 B2 | * | 3/2008 | Meckelburg | H04L 45/302 370/235 |
| 2002/0136162 A1 | * | 9/2002 | Yoshimura | H04L 29/06 370/229 |
| 2006/0133428 A1 | * | 6/2006 | Guthrie | H04L 43/0858 370/519 |
| 2006/0190610 A1 | * | 8/2006 | Motegi | H04L 1/1877 709/228 |

(Continued)

FOREIGN PATENT DOCUMENTS

| | | |
|---|---|---|
| JP | 7-163067 | 6/1995 |
| JP | 2005-250906 | 9/2005 |

(Continued)

OTHER PUBLICATIONS

Draper, "Cooperative Transmission for Wireless Networks Using Mutual-Information Accumulation", Aug. 2011, IEEE, vol. 57, pp. 5151-5162 (Year: 2011).*

(Continued)

*Primary Examiner* — Kenneth W Chang
*Assistant Examiner* — Gregory A Lane
(74) *Attorney, Agent, or Firm* — Oblon, McClelland, Maier & Neustadt, L.L.P.

(57) ABSTRACT

According to one embodiment, an electronic apparatus includes a memory and a hardware processor. The hardware processor is configured to store a log of a received packet in the memory, set a transmission delay time for the log stored in the memory, and transmit the log in accordance with the transmission delay time of the log.

18 Claims, 6 Drawing Sheets

(56) References Cited

U.S. PATENT DOCUMENTS

| | | | | |
|---|---|---|---|---|
| 2006/0222246 A1* | 10/2006 | Murai | ................... | G06F 3/1462 |
| | | | | 382/232 |
| 2007/0002748 A1* | 1/2007 | Nakata | ................... | H04L 12/56 |
| | | | | 370/238 |
| 2007/0177520 A1* | 8/2007 | Morinaga | ............. | H04L 47/115 |
| | | | | 370/252 |
| 2008/0228937 A1 | 9/2008 | Araumi | | |
| 2009/0003329 A1* | 1/2009 | Murakami | ............. | H04L 47/10 |
| | | | | 370/389 |
| 2009/0133038 A1* | 5/2009 | Chkodrov | ............. | G06Q 10/10 |
| | | | | 719/314 |
| 2011/0142079 A1* | 6/2011 | Wong | ................. | H04L 41/5009 |
| | | | | 370/503 |

FOREIGN PATENT DOCUMENTS

| | | |
|---|---|---|
| JP | 2008-71085 | 3/2008 |
| JP | 2010-252029 | 11/2010 |
| JP | 2012-181744 | 9/2012 |

OTHER PUBLICATIONS

International Search Report dated Oct. 1, 2013 in PCT/JP2013/067880, filed Jun. 28, 2013 (with English Translation).
Written Opinion dated Oct. 1, 2013 in PCT/JP2013/067880, filed Jun. 28, 2013.

* cited by examiner

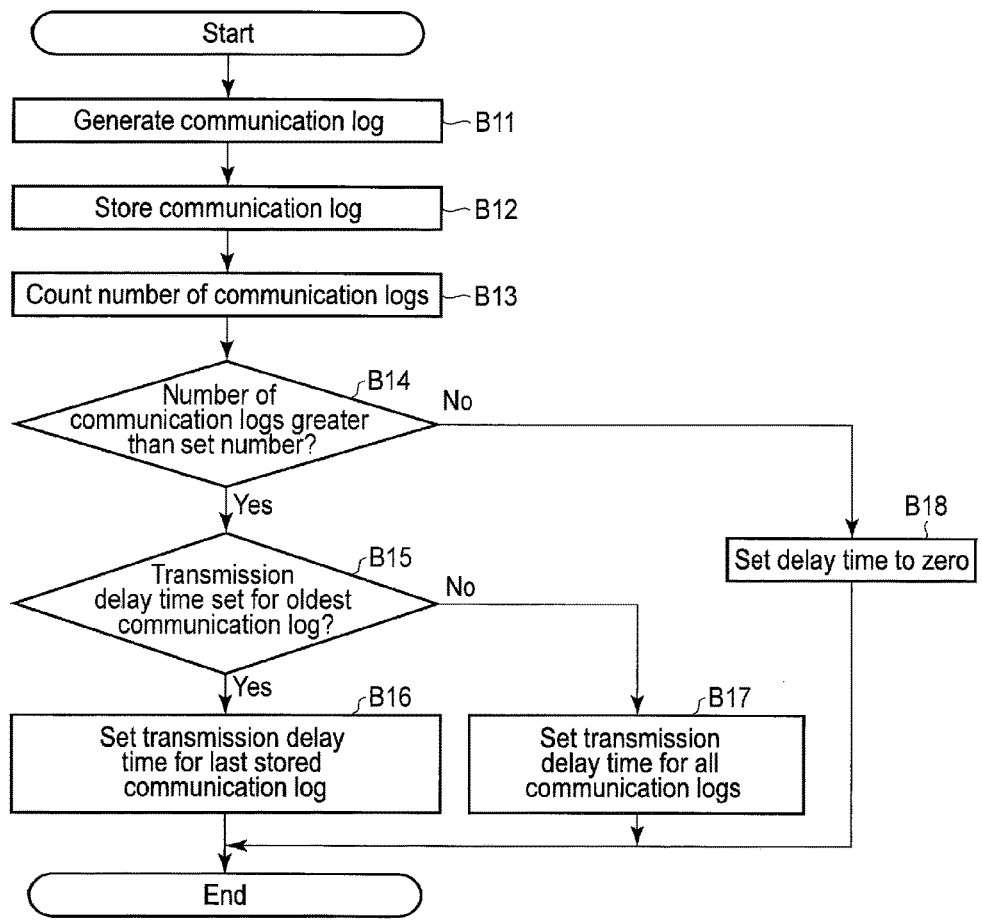
F I G. 4

ELECTRONIC APPARATUS AND METHOD

CROSS-REFERENCE TO RELATED APPLICATIONS

This application is a Continuation Application of PCT Application No. PCT/JP2013/067880, filed Jun. 28, 2013, the entire contents of which are incorporated herein by reference.

FIELD

Embodiments described herein relate generally to an electronic apparatus which transmits a communication log.

BACKGROUND

The threat of security attacks on a control system has been increasing. A technique of detecting the attacks by monitoring logs has attracted attention, because a facility update period of the control system is long unlike that of an IT system and the risk of a system suspension due to an update is high. A representative log includes communication logs.

In a state in which a number of communication packets occur for a short time at the time of failure in a control system, which is called a multiple state change, a number of communication logs are transmitted. Therefore, there have been cases in which when a number of communication logs are generated for a short time, a network band and a server load increase, thereby causing a transmission delay of a communication packet and the loss of a communication packet and a communication log.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 4 is an exemplary flowchart showing a procedure for generating a communication log and setting a transmission delay time for the communication log.

DETAILED DESCRIPTION

Various embodiments will be described hereinafter with reference to the accompanying drawings.

In general, according to one embodiment, an electronic apparatus includes a memory and a hardware processor. The hardware processor is configured to store a log of a received packet in the memory, set a transmission delay time for the log stored in the memory, and transmit the log in accordance with the transmission delay time of the log.

Figure 1:
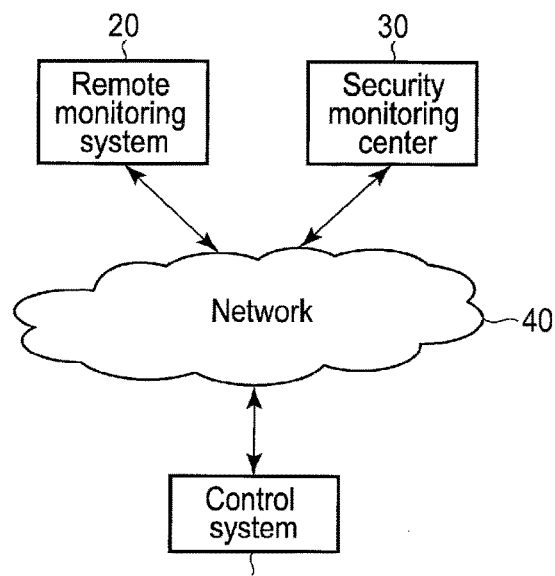
FIG. 1 is a block diagram showing an example of a configuration of a network system.

FIG. 1 is a diagram showing an example of a configuration of a network system including a communication log generation device of a present embodiment.

As shown in FIG. 1, a control system 10 for which security is monitored is connected to a remote monitoring system 20 and a security monitoring center 30 through a network 40 such as the Internet. The security monitoring center 30 detects and reports an attack on the control system 10 by analyzing and monitoring a communication log transmitted from the control system 10.

It should be noted that the remote monitoring system 20 may not be provided. In addition, a network connecting the control system 10 and the remote monitoring system 20, and a network connecting the control system 10 and the security monitoring center 30 may be the same network or different networks.

The control system 10 monitors a plant, a building, etc. The control system 10 reports a monitoring result to the remote monitoring system 20. The remote monitoring system 20 controls the control system 10 on the basis of the monitoring result.

The control system 10 transmits a communication log, which will be described later, to the security monitoring center 30. The security monitoring center 30 analyzes the communication log and detects a security attack or an intrusion which is a foretaste of the attack by analysis.

Figure 2:
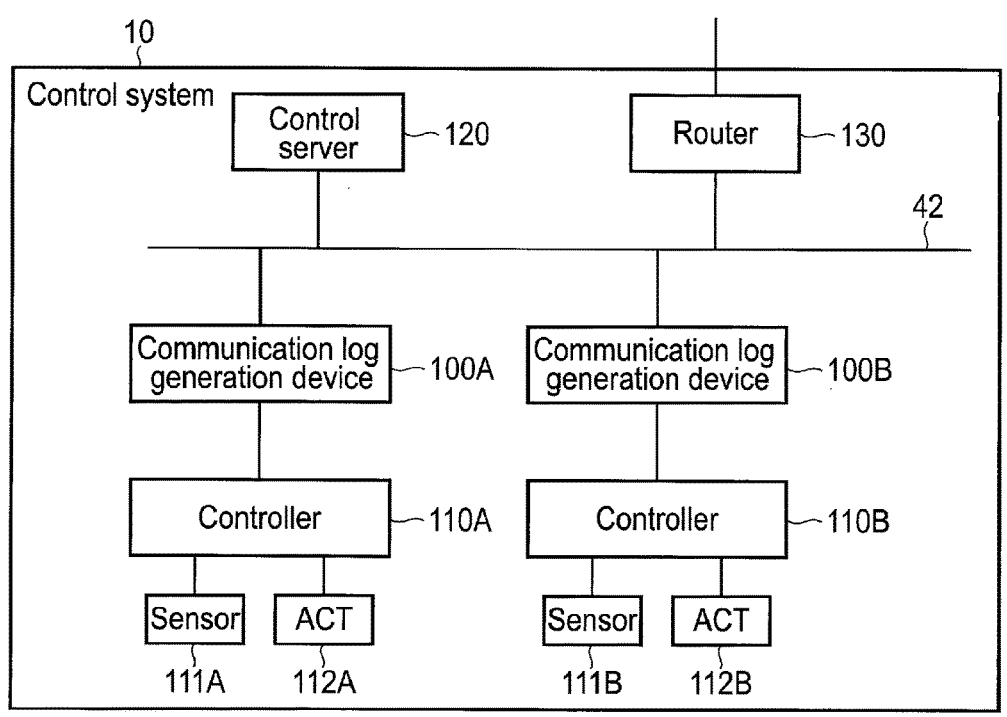
FIG. 2 is a block diagram showing an example of a configuration of the control system including a communication log generation device of an embodiment.

FIG. 2 is a block diagram showing an example of a configuration of the control system 10 including the communication log generation device of the present embodiment, which transmits a communication log. The control system 10 includes communication log generation devices 100A and 100B, controllers 110A and 110B, sensors 111A and 111B, actuators (ACT) 112A and 112B, a control server 120, a router 130, etc.

The controllers 110A and 110B are connected to a network 42 such as a local area network (LAN) through the communication log generation devices 100A and 100B. To the controllers 110A and 110B, the sensors 111A and 111B and the actuators 112A and 112B are connected. The control server 120 and the router 130 are connected to the network 42. It should be noted that the number of the sensors 111A and 111B may be plural and the number of the actuators 112A and 112B may be plural.

Figure 3:
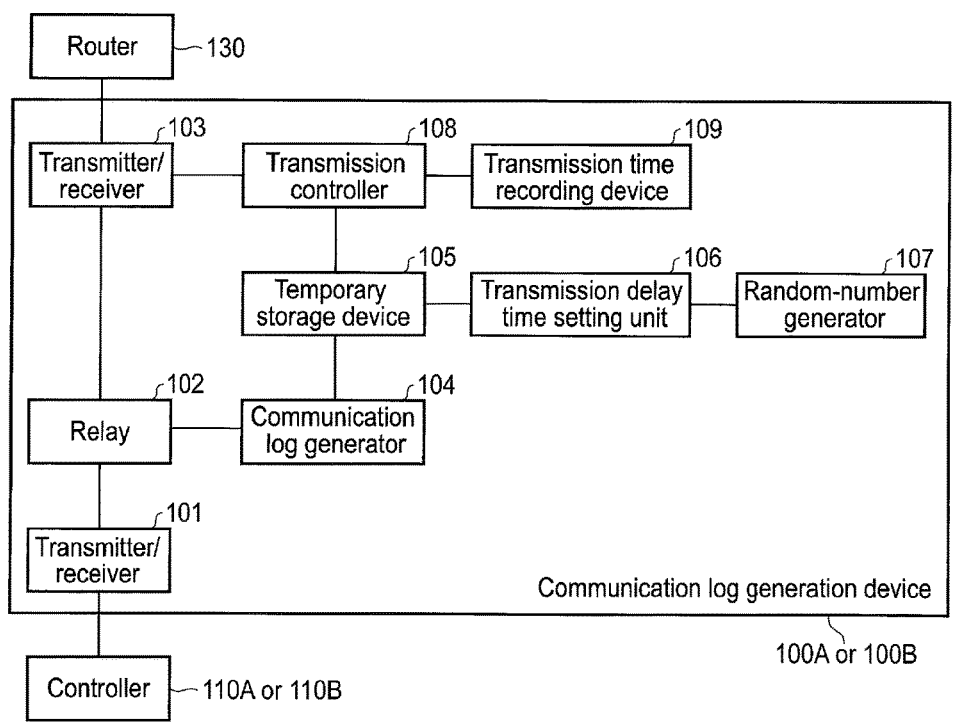
FIG. 3 is a block diagram showing an example of a configuration of the communication log generation device of the embodiment.

FIG. 3 is a block diagram showing an example of a configuration of the communication log generation device.

A communication log generation device 100A or 100B includes a first transmitter/receiver 101, a relay 102, a second transmitter/receiver 103, a communication log generator 104, a temporary storage device 105, a transmission delay time setting unit 106, a random-number generator 107, a transmission controller 108, a transmission time recording device 109, etc.

The first transmitter/receiver 101 receives packet data transmitted from the controller 110A or 110B. The first transmitter/receiver 101 transmits the packet data transmitted from the controller 110A or 110B to the second transmitter/receiver 103 through the relay 102. The second transmitter/receiver 103 transmits the packet data received through the relay 102.

The second transmitter/receiver 103 receives packet data for the controller 110A or 110B. The second transmitter/receiver 103 transmits the packet data for the controller 110A or 110B to the first transmitter/receiver 101 through the relay 102. The first transmitter/receiver 101 transmits the packet data received through the relay 102 to the controller 110A or 110B.

The relay 102 transmits received packet data to the communication log generator 104. Whenever the communication log generator 104 receives packet data, it generates a communication log based on the received packet data. The communication log includes, for example, an address of a transmission source of a packet, an address of a transmission target, all the data of packet data, or predetermined bytes of data of the packet data. The communication log further includes a timestamp. The communication log generator 104 stores a generated communication log in the temporary storage device 105.

The transmission delay time setting unit 106 sets a transmission delay time of a communication log stored in the temporary storage device 105 in accordance with the number of communication logs stored in the temporary storage device 105. If the number of communication logs stored in the temporary storage device 105 is not greater than a set number, the transmission delay time setting unit 106 sets a transmission delay time of a communication log stored in the temporary storage device 105 to zero. If the number of communication logs stored in the temporary storage device 105 is greater than the set number, the transmission delay time setting unit 106 sets a transmission delay time of a communication log stored in the temporary storage device 105 at a number greater than zero.

More specifically, when a communication log is newly stored in the temporary storage device 105, the transmission delay time setting unit 106 counts the number of communication logs stored in the temporary storage device 105. If the number of communication logs is not greater than the set number, the transmission delay time setting unit 106 sets a transmission delay time of a communication log stored in the temporary storage device 105 to zero. If the number of communication logs is greater than the set number, the transmission delay time setting unit 106 sets a transmission delay time of a communication log stored in the temporary storage device 105 at a number greater than zero. The transmission delay time setting unit 106 converts a random number generated by the random-number generator 107 into a transmission delay time using a predetermined function. As the predetermined function, a linear function, for example, is used. The transmission delay time setting unit 106 sets the converted transmission delay time for a communication log. It should be noted that the random-number generator 107 is omitted and the transmission delay time setting unit 106 may set a predefined fixed time as a transmission delay time.

The transmission controller 108 transmits a communication log to the security monitoring center 30 as an analysis device. The transmission timing is determined on the basis of a transmission delay time set for a communication log in the temporary storage device 105. When a communication log is transmitted, the transmission controller 108 records transmission time data indicating a transmission time in the transmission time recording device 109.

An operation of the communication log generating device 100A or 100B will be described. When a packet is received by the transmitter/receiver 101 or 103, a communication log is generated. The communication log is not transmitted to the security monitoring center 30 immediately. Instead, a transmission delay time is set for the communication log. The communication log is transmitted to the security monitoring center 30 at an appropriate timing based on the transmission delay time.

FIG. 4 is a flowchart showing a procedure of the communication log generation device 100A or 100B for generating a communication log and setting a transmission delay time for the communication log.

When packet data for the controller 110A or 110B or packet data transmitted from the controller 110A or 110B is received, the communication log generator 104 generates a communication log based on the received packet data (block B11). The communication log generator 104 stores generated packet data in the temporary storage device 105 (block B12).

When a communication log is newly stored in the temporary storage device 105, the transmission delay time setting unit 106 counts the number of communication logs stored in the temporary storage device 105 (block B13). The transmission delay time setting unit 106 determines whether the counted number of communication logs is greater than the set number (block B14). If the number of communication logs stored in the temporary storage device 105 is greater then the set number (Yes in block B14), the transmission delay time setting unit 106 determines whether a transmission delay time is set for the oldest communication log of the communication logs stored in the temporary storage device 105 (block B15). If it is determined that a transmission delay time is set for the oldest communication log (Yes in block B15), the transmission delay time setting unit 106 sets a transmission delay time for a communication log last stored in the temporary storage device 105 (block B16). If it is determined that a transmission delay time is not set for the oldest communication log (No in block B15), the transmission delay time setting unit 106 sets a transmission delay time for all the communication logs in the temporary storage device 105 (block B17).

If the number of communication logs stored in the temporary storage device 105 is not greater than the set number (No in block B14), the transmission delay time setting unit 106 sets the transmission delay times of all the communication logs stored in the temporary storage device 105 to zero (block B18).

Figure 5:
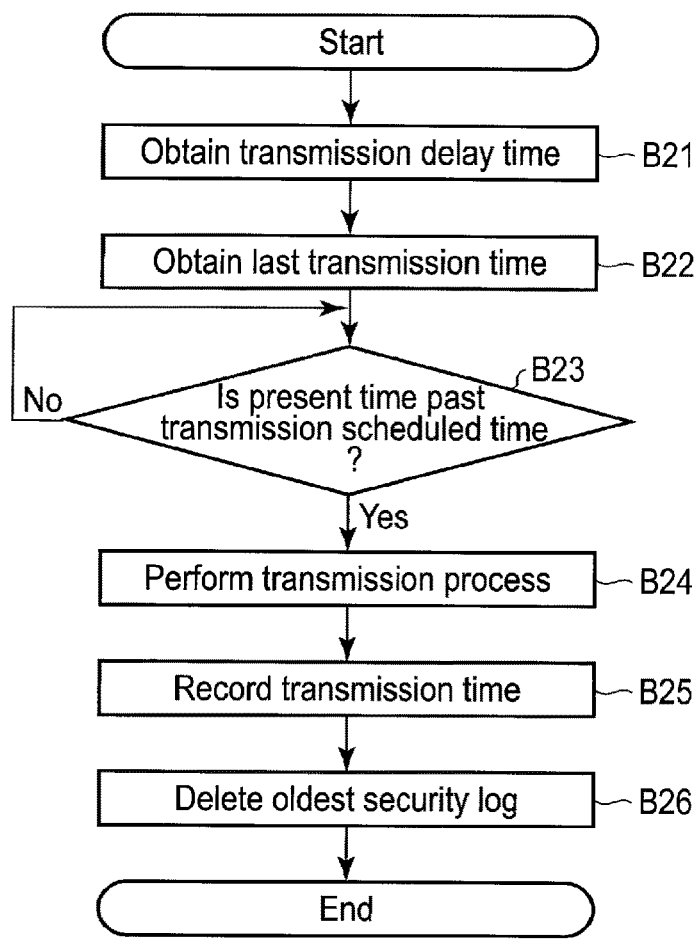
FIG. 5 is an exemplary flowchart showing a procedure for transmitting a communication log.

FIG. 5 is a flowchart showing a procedure of the transmission controller 108 for transmitting a communication log. The transmission controller 108 periodically or always executes the procedure shown in FIG. 5.

The transmission controller 108 obtains a transmission delay time set for the oldest communication log in the temporary storage device 105 (block B21). The transmission controller 108 obtains transmission time data indicating a transmission time of the last transmitted communication log from the transmission time recording device 109 (block B22). The transmission controller 108 determines whether the present time is past a transmission scheduled time which is a time obtained by adding a transmission delay time to the transmission time of the last transmitted communication log (block B23). If it is determined that the present time is not past the transmission scheduled time (No in block B23), the transmission controller 108 carries out block B23 again after a predetermined time. The predetermined time is, for example, a time obtained by subtracting the present time from the transmission scheduled time.

If it is determined that the present time is past the transmission scheduled time (Yes in block B23), the transmission controller 108 transmits the oldest communication log in the temporary storage device 105 to the security monitoring center 30 using the second transmitter/receiver 103 (block B24). The transmission controller 108 records a transmission time in the transmission time recording device 109 (block B25). The transmission controller 108 deletes the oldest communication log in the temporary storage device 105 (block B26).

As described, if the number of communication logs stored in the temporary storage device 105 is greater than a set number, a communication log is not immediately transmitted but is transmitted after a delay, whereby communication logs can be communicated without making a communication line busy with the communication logs even when a number of state change events such as a multiple state change in the control system occur.

(Time Correction)

A lag between a reception time at the security monitoring center 30 and an event occurrence time is caused by delaying transmission of a communication log. Although this problem can be avoided by adding a timestamp to the communication log, it is necessary that time synchronization of each device be accurate. Thus, if a transmission delay time is set for a communication log, delay time data indicative of a delay time may be added to the communication log in order to correct a time at the security monitoring center 30. The delay time data indicates a difference between a transmission scheduled time and a generation time of the communication log.

Figure 6:
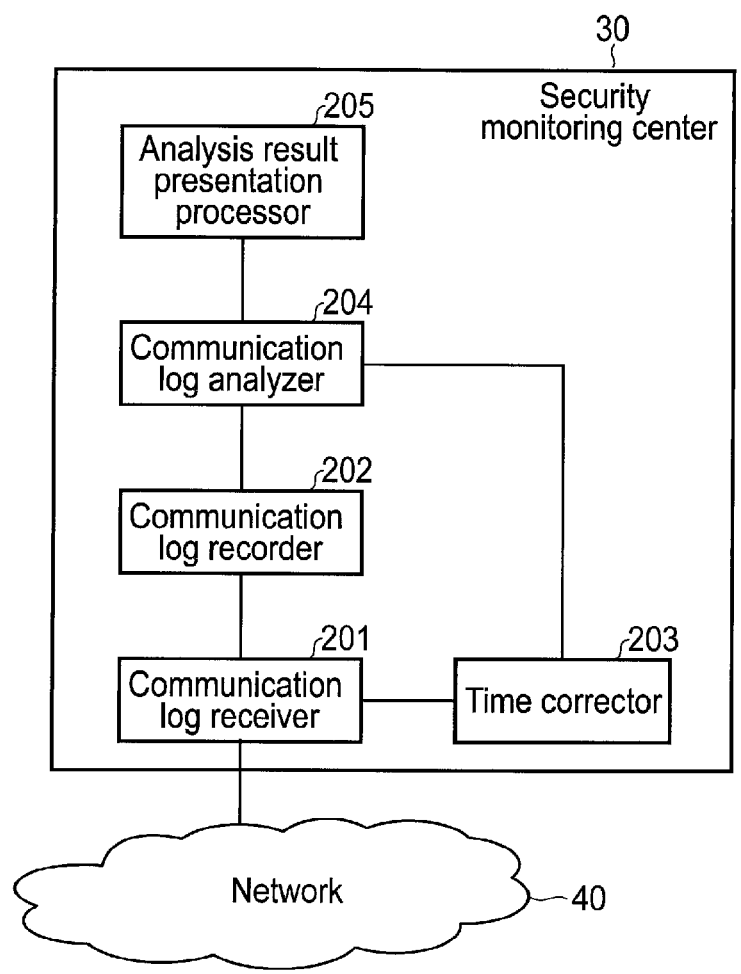
FIG. 6 is a block diagram showing an example of a configuration of a security monitoring center.

FIG. 6 is a block diagram showing an example of a configuration of the security monitoring center 30.

The security monitoring center 30 includes a communication log receiver 201, a communication log recorder 202, a time corrector 203, a communication log analyzer 204, an analysis result presentation processor 205, etc.

The communication log receiver 201 receives a communication log through the network 40. The received communication log is stored in the communication log recorder 202. The received communication log is supplied to the time corrector 203. The time corrector 203 corrects a transmission time (or a reception time) of the communication log on the basis of delay time data in the communication log. The communication log analyzer 204 analyzes the communication log using the corrected time. The communication log analyzer 204 detects a security attack or an intrusion which is a foretaste of the attack by analysis. Specifically, there is an analysis called an anomaly analysis. There is a method for determining an attack by finding a communication pattern different from a normal communication pattern by, for example, a correlation analysis. By this method, it is possible to detect a port scan which is usually performed prior to an attack. In order to find an attack target, ports not usually used are accessed a lot in the port scan. If a security attack or an intrusion which is a foretaste of the attack is detected, the analysis result presentation processor 205 performs a process of presenting this fact.

(Modification)

Figure 7:
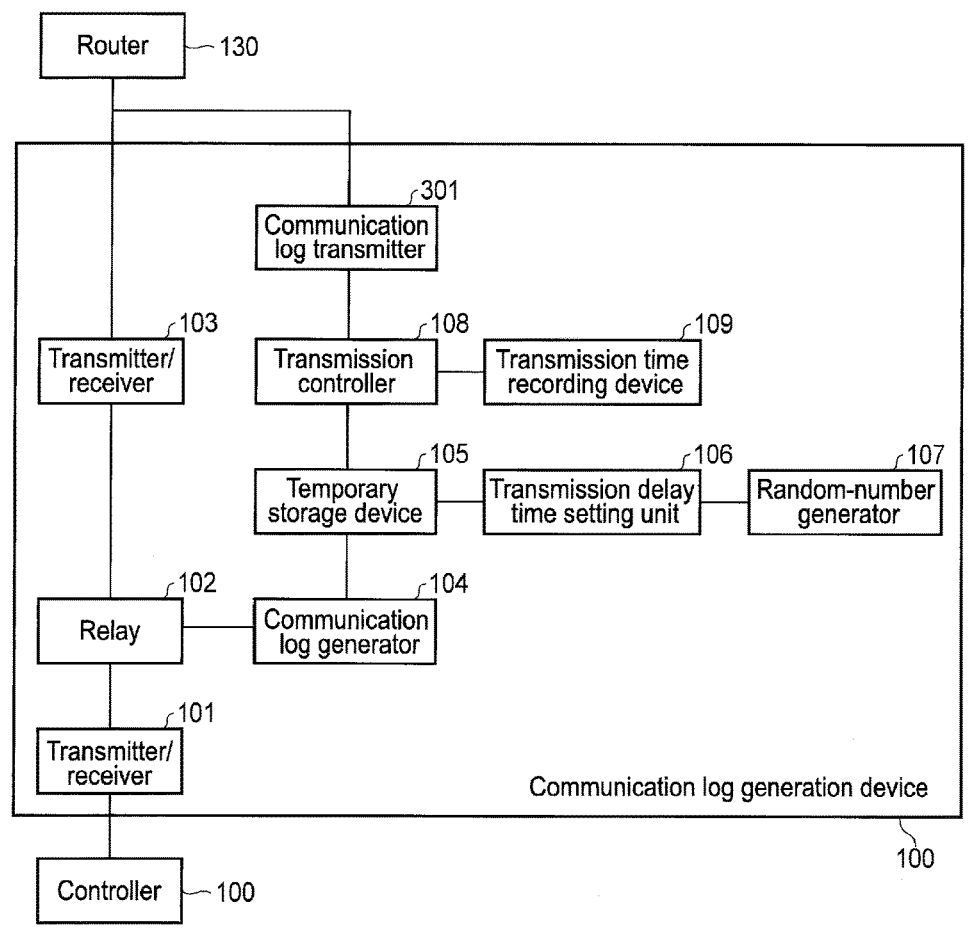
FIG. 7 is a block diagram showing another example of the configuration of the communication log generation device of the embodiment.

As shown in FIG. 7, a communication log transmitter 301 for transmitting a communication log may be provided so that the transmission controller 108 transmits a communication log to the security monitoring center 30 using the communication log transmitter 301 not the transmitter/receiver 103.

In the above-described embodiment, a time obtained by adding a transmission delay time to a transmission time of the last transmitted communication log is used as a transmission scheduled time. A time obtained by adding a transmission delay time to a time when a communication log is generated may be used as a transmission scheduled time. In this case, delay time data is a time indicating a difference between the transmission scheduled time and the generation time of the communication log.

According to the present embodiment, if the number of communication logs stored in the temporary storage device 105 is greater than a set number, a communication log is not immediately transmitted but is transmitted after a delay. Therefore, a communication line does not become busy with communication logs even when a number of state change events such as a multiple state change in the control system occur, and a transmission delay of a communication packet and the loss of a communication packet and a communication log can be prevented.

The various modules of the systems described herein can be implemented as software applications, hardware and/or software modules, or components on one or more computers, such as servers. While the various modules are illustrated separately, they may share some or all of the same underlying logic or code.

Some or all components of the control system 10, the remote monitoring system 20, the security monitoring center 30, and the communication log generation device 100A or 100B may be embodied by a hardware processor or software. The same advantages as those of the present embodiment can be easily achieved simply by installing a program for carrying out the steps of a control process in a normal computer through a computer-readable storage medium in which the program is stored, and executing the program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a receiver configured to receive packets;
a communication log generating circuit configured to generate communication logs for the packets received by the receiver;
a first memory configured to store the communication logs generated by the communication log generating circuit;
a transmitter configured to transmit the communication logs stored in the first memory; and
a hardware processor configured to
set a transmission delay time for the communication logs stored in the first memory to a first time when a number of the communication logs stored in the first memory is larger than a first number,
set the transmission delay time for the communication logs stored in the first memory to zero when the number of the communication logs stored in the first memory is not larger than the first number, and
cause the transmitter to transmit the communication logs stored in the first memory based on the transmission delay time.

2. The electronic apparatus of claim 1, wherein
the transmitter is configured to transmit the communication logs to an analyzer configured to analyze the communication logs.

3. The electronic apparatus of claim 1, wherein the first time is based on a random number.

4. The electronic apparatus of claim 1, further comprising:
a second memory configured to store a transmission time of a last transmitted communication log, wherein
the hardware processor causes the transmitter to transmit an oldest communication log of the communication logs stored in the first memory in accordance with a transmission delay time for the oldest communication log and the transmission time of the last transmitted communication log stored in the second memory.

5. The electronic apparatus of claim 1, wherein the communication logs comprise at least one of an address of a transmission source of the packets, an address of a transmission target, data of the packets, predetermined bytes of the data of the packets, or a timestamp.

6. The electronic apparatus of claim 1, wherein
the hardware processor is configured to set a transmission delay time for a newest communication log of the communication logs stored in the first memory to the first time when the number of the communication logs is larger than the first number and the transmission delay time is set for an oldest communication log of the communication logs stored in the first memory; and
the hardware processor is configured to set transmission delay times for all of the communication logs stored in the first memory to the first time when the number of the communication logs is larger than the first number and a transmission delay time is not set for the oldest communication log.

7. A method comprising:
receiving, by a receiver, packets;
generating, by a communication log generating circuit, communication logs for the packets received by the receiver;
storing the communication logs in a first memory;
transmitting, by a transmitter, the communication logs stored in the first memory;
setting, by a hardware processor, a transmission delay time for the communication logs stored in the first memory to a first time when a number of the communication logs stored in the first memory is larger than a first number;
setting, by the hardware processor, the transmission delay time for the communication logs stored in the first memory to zero when the number of the communication logs stored in the first memory is not larger than the first number; and
transmitting, by the transmitter, the communication logs stored in the first memory based on the transmission delay time.

8. The method of claim 7, further comprising:
transmitting, by the transmitter, the communication logs to an analyzer configured to analyze the communication logs.

9. The method of claim 7, wherein the first time is based on a random number.

10. The method of claim 7, further comprising:
storing a transmission time of a last transmitted communication log in a second memory; and
transmitting, by the hardware processor, an oldest communication log of the communication logs stored in the first memory in accordance with a transmission delay time for the oldest communication log and the transmission time of the last transmitted communication log stored in the second memory.

11. The method of claim 7, wherein the communication logs comprise at least one of an address of a transmission source of the packets, an address of a transmission target, data of the packets, predetermined bytes of the data of the packets, or a timestamp.

12. The method of claim 7, further comprising:
setting a transmission delay time for a newest communication log of the communication logs stored in the first memory to the first time when the number of the communication logs is larger than the first number and the transmission delay time is set for an oldest communication log of the communication logs stored in the first memory; and
setting transmission delay times for all of the communication logs stored in the first memory to the first time when the number of the communication logs is larger than the first number and a transmission delay time is not set for the oldest communication log.

13. A non-transitory computer-readable storage medium having stored thereon a computer program which is executable by a computer, the computer program comprising instructions, when executed by the computer to perform functions of:
receiving packets;
generating communication logs for the received packets;
storing the communication logs in a first memory;
transmitting the communication logs stored in the first memory;
setting a transmission delay time for the communication logs stored in the first memory to a first time when a number of the communication logs stored in the first memory is larger than a first number;
setting the value of the transmission delay time for the communication logs stored in the first memory to zero when the number of the communication logs stored in the first memory is not larger than the first number; and
transmitting the communication logs stored in the first memory based on the transmission delay time.

14. The storage medium of claim 13, further comprising:
transmitting the communication logs to an analyzer configured to analyze the communication logs.

15. The storage medium of claim 13, wherein the first time is based on a random number.

16. The storage medium of claim 13, further comprising:
storing a transmission time of a last transmitted communication log in a second memory; and
transmitting an oldest communication log of the communication logs stored in the first memory in accordance with a transmission delay time for the oldest communication log and the transmission time of the last transmitted communication log stored in the second memory.

17. The storage medium of claim 13, wherein the communication logs comprise at least one of an address of a transmission source of the packets, an address of a transmission target, data of the packets, predetermined bytes of the data of the packets, or a timestamp.

18. The storage medium of claim 13, further comprising:
setting a transmission delay time for a newest communication log of the communication logs stored in the first memory to the first time when the number of the communication logs is larger than the first number and the transmission delay time is set for an oldest communication log of the communication logs stored in the first memory; and
setting transmission delay times for all of the communication logs stored in the first memory to the first time when the number of the communication logs is larger than the first number and a transmission delay time is not set for the oldest communication log.

* * * * *